Patented Jan. 21, 1941

2,229,465

UNITED STATES PATENT OFFICE 2,229,465

ACTIVATED PHENOLPHTHALEIN AND METHOD OF PRODUCING THE SAME

Siegfried Loewe, New Rochelle, N. Y.

No Drawing. Application January 21, 1938, Serial No. 186,081

2 Claims. (Cl. 167—56)

The object of the present invention is to provide activated phenolphthalein, that is to say, a controlled alteration of the physico-chemical state of the chemical entity phonelphthalein resulting in an increase in its potency.

I have discovered that by subjecting phenolphthalein to procedures of merely physico-chemical nature in which the crystalline phenolphthalein ($C_{20}H_{14}O_4$) undergoes no perceptible stoichiometric alteration but is transferred to a state of higher potency, which may be up or even beyond ten times higher than that of the phenolphthalein acted upon.

The invention is applicable not only to white phenolphthalein, which has been so produced as to embody a relatively high degree of purity, but also to the various commercial forms, including the so-called yellow phenolphthalein, irrespective of its potency, which are known to have potency generally different from white phenolphthalein.

A further utility of the present invention lies in the fact that the new product, activated phenolphthalein can be produced with varied potency since, at will, and under control, a higher or lower degree of activation can be effected by varying the activator employed and/or the amount of activator admixed, and the procedure of combining activator and the phenolphthalein.

As an example—

(1) In a suitable container, 3 kgm. benzylalcohol are slowly added to 10 kgm. of pure white phenolphthalein at a temperature of 95° C. and under thorough stirring through a mixing mill, mechanical grinder, or other means for securing an intimate mixture. When all the benzylalcohol is added, the temperature is reduced to 80° C., and at this temperature the process of stirring, grinding or agitation is continued for six hours. Thereafter, the heating is discontinued, and the grinding, stirring or other agitation is continued until the mixture has cooled to room temperature. The mixture is then spread on plates in a flat layer, and transferred into a vacuum desiccator, to be freed therefrom a surplus of benzylalcohol, until a sample transferred into a vacuum pistol for two hours loses not more than 10 percent of its weight at 150° C. and 15 mm. Hg. If, correspondingly, the weight of the entire mass is below 11 kgm., the process of desiccating is ended, and the material is transferred to suitable containers.

As a further example—

(2) 1 kgm. pure white phenolphthalein and 40 grams of chemically pure fluorane are dissolved in 40 liters of freshly prepared 10 percent aqueous sodium hydroxide solution. The clear solution is placed in a suitable container, and, under continuous stirring, a fine stream of diluted sulfuric acid is allowed to drip into the container, until the pink color has disappeared and the reaction of the mixture remains definitely acid. The precipitate formed is collected on a filter, and is gently dried in a desiccator at room temperature.

A study of the foregoing examples will show a common characteristic, i. e., that the activators employed have no laxative potency of their own or, at least, no quantitatively appreciable laxative potency.

A small percentage of the activator is sufficient to produce the activation, and I have discovered that the degree of activation does not increase proportionally with further increase of this percentage, the optimum of activation being reached by a percentage of activator substantially below 50% of the phenolphthalein to be activated. For example, I have increased the activation of a given form of phenolphthalein by ten times, through the use of less than 5% benzylalcohol as an activator.

Substances of such considerable chemical inertia as fluorane or high molecular condensation products of phenol are as effective activators for phenolphthalein as are the mono- or pluri-valent, preferably, aromatic alcohols, ketones, aldehydes and acids, as well as the esters or ethers of the said alcohols and acids, which demonstrates the fact that the mechanism of actuation is not due to a chemical but to a physico-chemical interaction between the activator and phenolphthalein.

The process of activation is induced by effecting an intimate contact between activator and phenolphthalein. This is performed, as shown in the above examples, by either dissolving at a lower or higher temperature, the phenolphthalein in the activating substance or vice versa, or by dissolving both activator and phenolphthalein in a common solvent and subsequently precipitating them therefrom by another solvent or by change of the pH of the solution or by allowing them to form a combined crystallisate. In all these cases, the activator may or may not be withdrawn from the activated phenolphthalein partially or completely, for instance, by more or less complete evaporation when the activator is volatile, or by washing with a selective solvent in which the activator is more soluble than phenolphthalein.

According to the above, activated phenolphthalein is a chemically or commercially pure phenolphthalein which, whilst being free from any admixed substances of laxative nature and containing only traces or at the utmost 10% of well characterized substances bare of laxative effectiveness, is equipped with a biological potency—recognizable through bio-assay on monkeys by measuring the increase of their intestinal activity—higher than the starting products.

Through the present invention, substances become available which are not only equal to any type of commercial or chemical phenolphthalein in all their characteristic and desirable properties, but are equipped with a much higher degree of the commercially most important property of phenolphthalein, namely, its capacity of acting upon biological substrata.

In order to represent numerically the progress attained through this invention, that capacity of phenolphthalein may be expressed in terms of potency, as measured in the bio-assay method. If the potency of an extremely purified white phenolphthalein is designated at 1.0, that of other lots of pure white phenolphthalein, either from the market or gained by repeated purification in the research laboratory, is found varying in the range from 0.8 to 2.0. In measuring the potency of commercial, so-called yellow phenolphthalein, that is of various phenolphthaleins which are not freed from their presumably laxative by-products, a range from 1.3 to 3.5 is found, as referred to pure white phenolphthalein as 1.0.

My activated phenolphthalein, in range of potency, may be extended by about 300% over the upper limit of 3.5 accessible under the prior state of the art. In fact, the increase in potency obtained can be still larger than 300% because under the invention potencies can be obtained above 3.5 not only by starting with say, yellow phenolphthalein of comparatively high potency, but just as well by activating an extremely pure white phenolphthalein, the original potency of which was at the lowest end of the entire range. For instance, in the case of the two examples given, the starting material was a pure white phenolphthalein with a potency as low as 0.8 in the above terms. However, the activated end product showed a potency as high as 4.0 in the first, and 9.0 in the second example, that is an activation by 500 and by 1100%, respectively.

Whereas these figures show the increase in potency made possible by the present invention, an increase, which, moreover, is not paralleled by a deterioration of the purity as it occurred when the weak white phenolphthalein had to be substituted by the relatively more potent impure yellow phenolphthalein, it is a further new effect of the present invention, that the degree of activation, i. e., the increase in potency, can be varied to any desirable degree, since, at will and under control, a higher or lower degree of activation can be effected by varying the activator employed or the amount of activator admixed or the intimacy of the combination of activator and phenolphthalein.

As an example of the above—

(3) 1 kgm. pure white phenolphthalein and 40 grams of chemically pure fluorane are dissolved in 10 liters of ethanol. The solvent is then removed by distillation and the residue is dried and finely pulverized.

In this example, the activator and the phenolphthalein used were identical to those of Example 2. However, due to the difference in the procedure of combining, a difference in the degree of activation resulted, the activated end product from the latter example being only one third as active—in the monkey assay—compared with that from the former example.

This last example illustrates the fact that the degree of potency is affected by the intimacy of combination of the phenolphthalein and activator. In the first example a fine precipitate is effected whereby each one of the minute particles of the precipitate contains molecules of both components in a narrow contact. In the last example only crystals of the two components proceeding from the evaporation of the common solvent are mixed, whereby only crystalline aggregates, and not the single molecules of the two components, are in contact with each other.

Having described my invention, what I claim and desire to secure by Letters Patent is as follows:

1. A method of producing activated phenolphthalein which consists in dissolving a quantity of phenolphthalein in an activator therefor consisting of benzyl alcohol, and removing the greater proportion of the solvent-activator.

2. A body of phenolphthalein with a minor proportion of activating material comprising benzyl alcohol.

SIEGFRIED LOEWE.